Aug. 11, 1925.  1,549,624
L. G. STRANSKY
AUXILIARY AIR INLET AND MIXING DEVICE FOR MOTOR VEHICLES
Filed Dec. 23, 1924  2 Sheets-Sheet 1
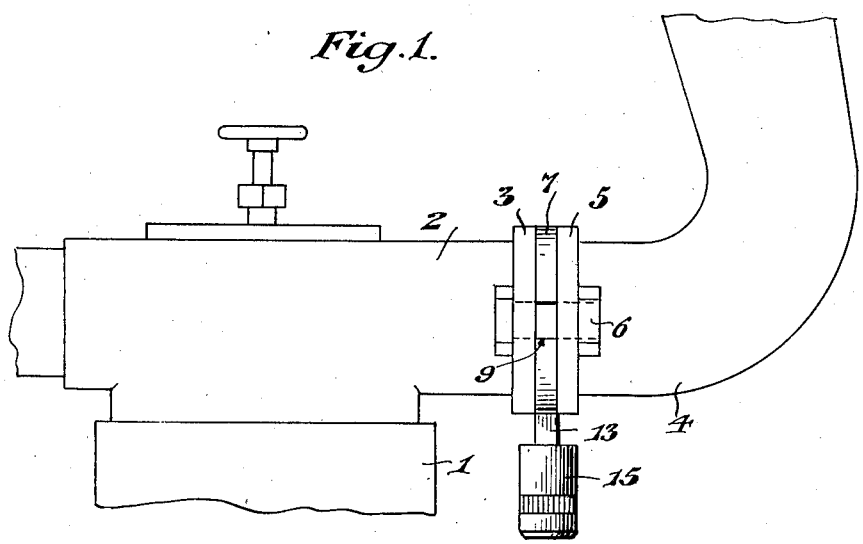
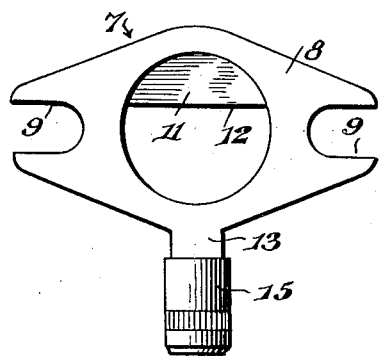 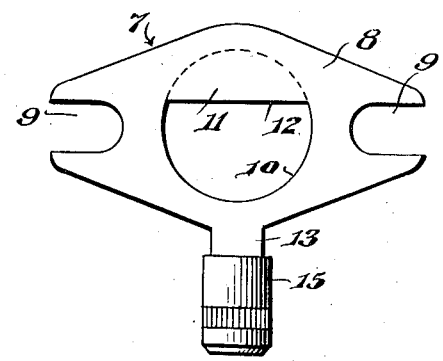
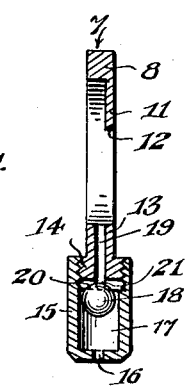
INVENTOR.
Leo G. Stransky,
BY
Geo. F. Kimmel
ATTORNEY.

Aug. 11, 1925.  
L. G. STRANSKY  
1,549,624  
AUXILIARY AIR INLET AND MIXING DEVICE FOR MOTOR VEHICLES  
Filed Dec. 23, 1924    2 Sheets-Sheet 2

INVENTOR.  
Leo G. Stransky,  
BY  
Geo. P. Kimmel  
ATTORNEY.

Patented Aug. 11, 1925.

1,549,624

UNITED STATES PATENT OFFICE.

LEO G. STRANSKY, OF PUKWANA, SOUTH DAKOTA.

AUXILIARY AIR INLET AND MIXING DEVICE FOR MOTOR VEHICLES.

Application filed December 23, 1924. Serial No. 757,689.

*To all whom it may concern:*

Be it known that I, LEO G. STRANSKY, a citizen of the United States, residing at Pukwana, in the county of Brule and State of South Dakota, have invented certain new and useful Improvements in Auxiliary Air Inlet and Mixing Devices for Motor Vehicles, of which the following is a specification.

This invention relates to an auxiliary air inlet and mixing device or attachment for motor vehicles, and is designed primarily for use in connection with the intake manifold of a Ford type of car, but it is to be understood that an auxiliary air inlet and mixing device or attachment in accordance with this invention can be employed for any type of intake manifold for which it is found applicable, and the invention has for its object to provide, in a manner as hereinafter set forth, an auxiliary air inlet and mixing device or attachment adapted to be interposed in the intake manifold of the engine to provide for the vaporization of the heavy particles of gasoline that are naturally found in the lower part of an intake manifold.

A further object of the invention is to provide, in a manner as hereinafter set forth, an auxiliary air inlet and mixing device or attachment adapted to be interposed in the intake manifold of the engine and provided with a baffle for deflecting the flow of gasoline to cause the vaporizing of the heavy particles of gasoline that are naturally found in the lower part of an intake manifold, and further provided with means to provide for an additional supply of atmospheric air coacting with the baffle to thoroughly vaporize the gasoline supplied from the carbureter, thereby producing an unusually rich and powerful charge resulting in increased efficiency of the engine without increasing the cost of operation.

Further objects of the invention are to provide an auxiliary air inlet and mixing device or attachment, in a manner as hereinafter set forth, which is simple in its construction and arrangement, strong, durable, compact, thoroughly efficient in its use, readily installed with respect to the intake manifold, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of an intake manifold, showing the adaptation therewith of an attachment in accordance with this invention.

Figure 2 is an elevation looking towards one side of the attachment.

Figure 3 is an elevation looking towards the other side of the attachment.

Figure 4 is a vertical sectional view of the attachment.

Figure 5:
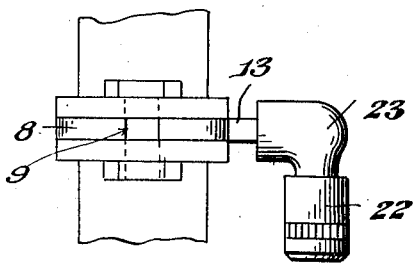
Figure 5 is a top plan view illustrating a modified form of attachment.

Referring to Figures 1 to 4 of the drawings, 1 denotes a carbureter, 2 an outlet pipe thereof formed with a flange 3 at its free terminus. The intake manifold of the engine is indicated at 4 and which has that end opposing the free terminus of the outlet pipe 2 provided with a flange 5 of the same contour as the flange 3. Interposed between the flanges 3 and 5, as well as being secured to said flanges by hold-fast devices 6, only one of which is shown, is a vaporizing attachment in accordance with this invention and which is referred to generally by the reference character 7.

The auxiliary air inlet and mixing device or attachment comprises a body portion 8 in the form of a plate of substantial thickness, and which conforms in contour to the flanges 3 and 5. The body portion 8 gradually decreases in width from its transverse center towards each end and each of its ends is slotted, as at 9, for the passage of hold-fast devices 6, these latter being arranged at each side of the pipe 2 and intake manifold 4. The hold-fast devices 6 provide means for fixedly securing the body portion 8 between the flanges 3 and 5.

The body portion 8, centrally thereof, is provided with an opening 10 which registers with the openings formed respectively by the pipe 2 and intake manifold 4, and preferably the wall of the opening 10 acts as a continuation of the inner face of the pipe 2 and intake manifold 4.

The body portion 8 further includes a segment-shaped baffle 11, arranged at the upper portion of the opening 10. The baffle 11 is of a thickness materially less than half the width of the wall of the opening 10 and the outer face of the baffle 11 is flush with the rear face of the body portion 8. The lower edge 12 of the baffle 11 is disposed above the axis of the opening 10 and said baffle 11 is integral with the body portion 8. The function of the baffle 11 is to change the course of the flow of gasoline so that the gasoline will be deflected in a downward direction and will vaporize the heavy particles of gasoline that are naturally found in the lower part of the manifold as when the gasoline is directed downwardly it will come into contact with an additional supply of atmospheric air, which not only tends to thoroughly vaporize the gasoline, but such addition produces an unusually rich and powerful charge resulting in increased efficiency of the engine without increasing cost of operation.

Depending from the body portion 8, as well as below the flanges 3, 5, and arranged centrally of said body portion 8, is an extension 13, formed with an enlarged cylindrical peripherally threaded free end 14, with which threadedly engages a valve casing 15, formed with an inlet port 16. Operating within the chamber 17 formed by the casing 15, is a freely movable globular valve 18 employed for closing the port 16 and for partially closing an air supply passage 19, which is formed in the extension 13 and communicates with the opening 10 and is employed for supplying atmospheric air for the purpose referred to. The free end of the extension 13 is shaped to provide a valve seat 20 for the valve 18 and notched as at 21 to provide by-passes when the valve is seated.

Figure 6:
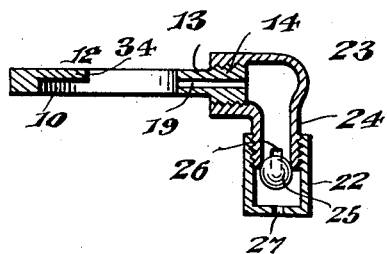
Figure 6 is a cross sectional view of the form of attachment as illustrated in Figure 5.
Figure 7:
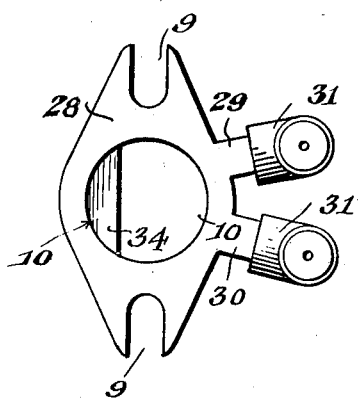
Figure 7 is an elevation of still another modified form of attachment.

In the form shown in Figures 5, 6 and 7, the valve casing which is referred to by the reference character 22, is not connected directly to the extension 13 but threadedly engages with an elbow 23, which is detachably connected to and projects from the extension 13. The outer end of the elbow 23 is shaped to provide a valve seat 24 for the valve 25, and said outer end is notched, as at 26, to provide by-passes. The casing 22 has an inlet port 27. In Figures 5 and 6, a single extension 13 is employed, whereas in Figure 7 the body portion indicated at 28, is provided with two extensions 29, 30.

Figure 8:
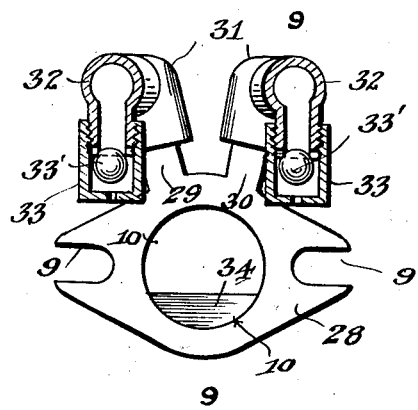
Figure 8 is a sectional elevation of still another modified form of attachment.
Figure 9:
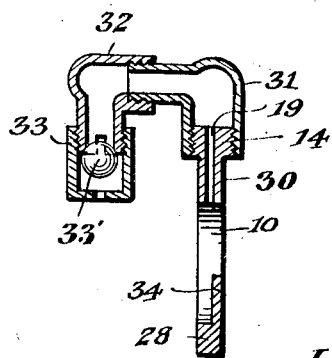
Figure 9 is a section on line 9—9, Figure 8.

In the form shown in Figures 8 and 9, the oppositely inclined extensions 29, 30 of the body portion 28, each carries an elbow 31 having connected therewith an elbow 32, carrying a valve casing 33, in which is arranged a valve 33'. The construction of the elbow 32 is the same as the elbow 23.

In Figures 6, 7, 8 and 9, the baffle is indicated at 34.

From the foregoing description taken in connection with the accompanying drawings, a vaporizing attachment is set up, including a baffle and means for supplying atmospheric air, and the arrangement is such that the heavy particles of gasoline that are naturally found in the lower part of the intake manifold will be vaporized, and further the gasoline will be thoroughly vaporized and enriched to produce an unusually rich and powerful charge whereby the efficiency of the engine will be increased without increasing the cost of operation, and further that the additional charge of atmospheric air will be had during the suction stroke of the engine, and although the preferred embodiments of the invention are as referred to, yet it is to be understood that changes in the details of construction can be had without departing from the scope of the invention as claimed.

What I claim is:—

1. An attachment for the purpose set forth comprising a plate having an opening adapted to communicate with the intake manifold of an engine and further provided with an atmospheric supply passage communicating with said opening through the wall of the latter, and a segment-shaped baffle arranged in said opening and having its free edge arranged opposite said passage.

2. An attachment for the purpose set forth comprising a plate adapted to be interposed in the intake of an engine and provided with an opening having its wall registering with the wall of the passage formed by said intake, said plate further provided with an atmospheric air supply passage communicating with said opening through the wall thereof, valvular means carried by the plate for controlling the supply of atmospheric air through said passage, and a segment-shaped baffle integral with the wall of said opening, the free edge of said baffle being positioned to one side of the axis of said opening and opposing and spaced from that part of the wall of said opening through which said passage opens, said baffle of materially less thickness than the width of the wall of said opening.

3. An attachment for the purpose set forth comprising a plate adapted to be interposed in the intake of an engine and provided with an opening having its wall registering with the wall of the passage formed by said intake, said plate further provided with an atmospheric air supply passage communicating with said opening through the wall thereof, valvular means carried by the plate for controlling the supply of atmospheric air through said passage, and a segment-shaped baffle integral with the wall of said opening, the free edge of said baffle being positioned to one side of the axis of said opening and opposing and spaced from that part of the wall of said opening through which said passage opens, said baffle of materially less thickness than the width of the wall of said opening and having its outer face flush with one of the side faces of said plate.

In testimony whereof, I affix my signature hereto.

LEO G. STRANSKY.